June 19, 1934.                G. M. WALTERS                1,963,107
                                 CAMERA
                            Filed Oct. 4, 1932            6 Sheets-Sheet 2

Inventor
George M. Walters
By Lyon & Lyon
Attorneys

June 19, 1934.　　　　G. M. WALTERS　　　　1,963,107
CAMERA
Filed Oct. 4, 1932　　　　6 Sheets-Sheet 4

Inventor
George M. Walters
By Lyon & Lyon
Attorneys

June 19, 1934.  G. M. WALTERS  1,963,107
CAMERA
Filed Oct. 4, 1932  6 Sheets-Sheet 5

Inventor
George M. Walters
By Lyon & Lyon
Attorneys

June 19, 1934.  G. M. WALTERS  1,963,107
CAMERA
Filed Oct. 4, 1932   6 Sheets-Sheet 6

Inventor
George M. Walters
By Lyon & Lyon
Attorneys

Patented June 19, 1934

1,963,107

UNITED STATES PATENT OFFICE 1,963,107

CAMERA

George M. Walters, Glendale, Calif., assignor to Motoflex, Inc., a corporation

Application October 4, 1932, Serial No. 636,127

18 Claims. (Cl. 95—42)

This invention relates to photographic cameras, and particularly to studio cameras for professional photographers.

A broad object of the invention is to provide a studio camera having all the necessary features commonly incorporated in such cameras and that can in addition be rapidly operated by actuation of a single simple control device.

Another object is to provide a completely electrically controlled studio camera.

Another object is to provide a simple and compact curtain type shutter for a studio camera, the exposure time of which shutter can be regulated by time control apparatus remote from the shutter itself and which is set and tripped electrically.

Another object is to provide a practical studio camera using roll film in which the movement of the film between successive exposures is automatically effected.

Still another object is to provide for the ready numbering of negatives as they are exposed, for purposes of identification.

In the past, many automatic cameras have been designed for operation by a person to be photographed, such cameras usually being operated by coin controlled mechanisms and developing and delivering completed pictures. These cameras are not suitable for professional studio work because they usually are adapted to handle plates or films of only a single predetermined small size, do not provide for variations in the time of exposure and have no adequate facilities for variable focusing.

The cameras generally used in professional studios for portrait and scenery work are substantially the same today as twenty-five years ago or even longer. They comprise a simple extensible box with a lens and shutter in the forward end, a focusing screen at the rear end, and removable holders containing either glass plates or cut film. In operation, such cameras must first be oriented and focused while observing the image on the focusing screen, and then prepared for the exposure of a plate by closing the shutter, inserting a plate holder, and removing the slide from the plate holder. It is impossible with such cameras to follow the subject on the focusing screen and suddenly make the exposure as the subject assumes a desired pose or expression. I am aware that reflex cameras have long been in use and that such cameras overcome the aforementioned objectionable features of studio cameras, but reflex cameras have never, to my knowledge, been adapted to the use of the studio photographer.

In accordance with the present invention, I provide a camera adapted for studio photography, having many of the advantages not found in any prior known cameras. These advantages are obtained by radically new structural features which can be most readily explained with reference to the drawings, in which:

Figure 1:
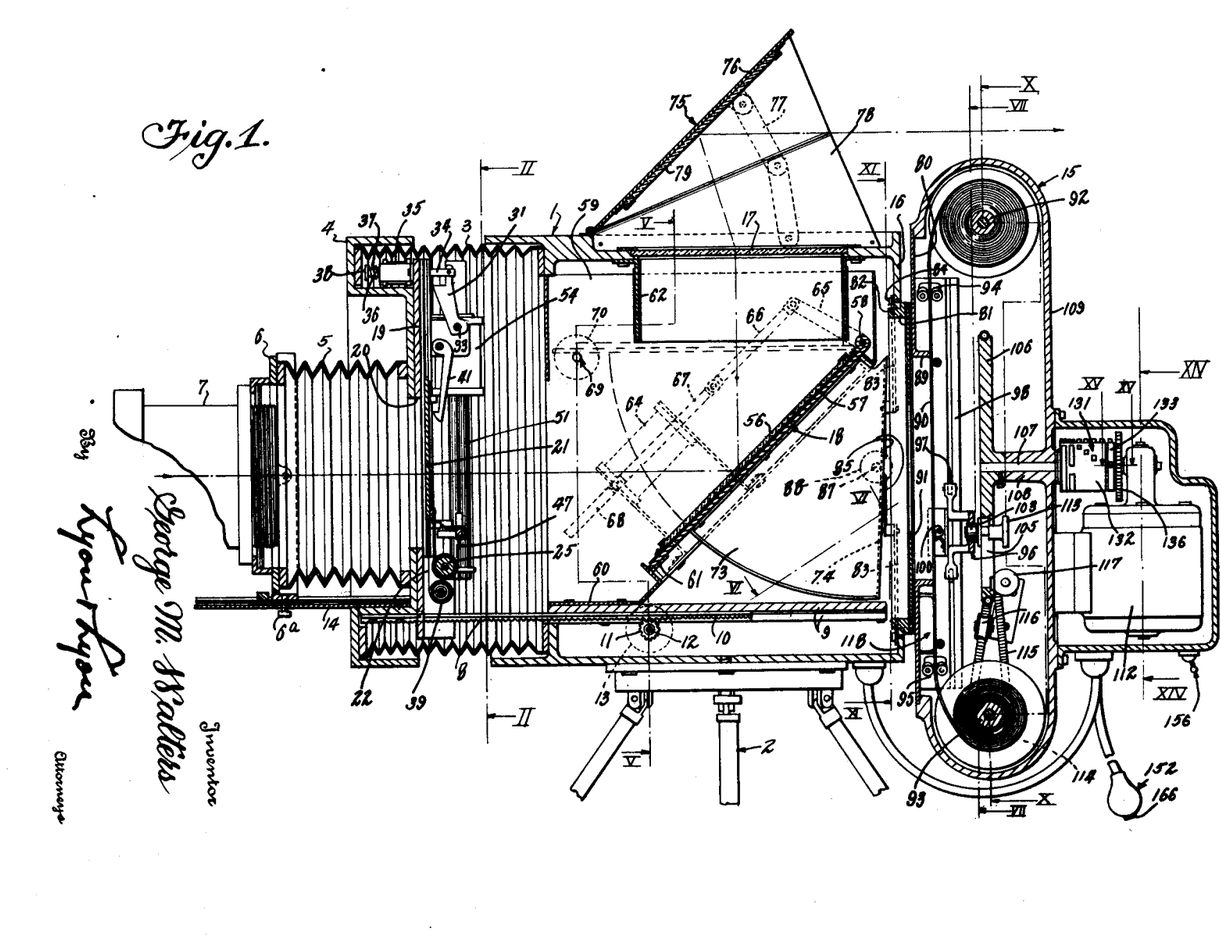
Figure 1 is a side elevational sectional view through a camera in accordance with my invention.
Figure 2:
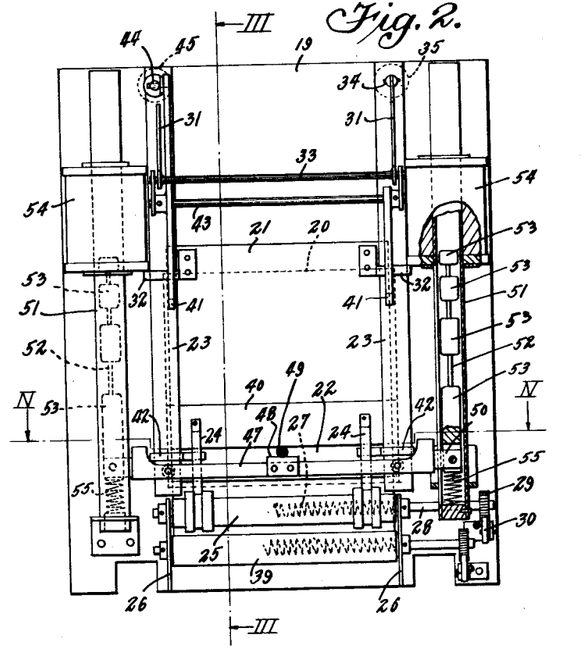
Figure 2 is a detail rear elevational view of the shutter mechanism taken in the plane II—II of Figure 1.
Figure 3:
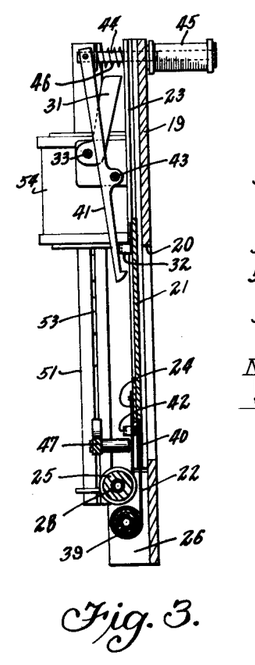
Figure 3 is a side sectional view of the shutter construction shown in Figure 2.
Figure 4:
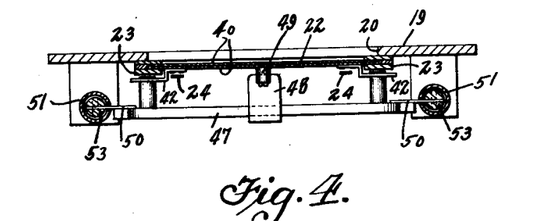
Figure 4 is a horizontal sectional detail view of the shutter mechanism taken in the plane IV—IV of Figure 2.

Referring to Figure 1, my camera comprises a box-like frame member 1 having openings in the forward and rear ends and in the top thereof, but having light-tight side and bottom walls. This frame member 1 is ordinarily supported upon a tripod designated generally at 2. The side, bottom and top walls of the frame member 1 are continued forwardly by a bellows 3 to a shutter supporting frame 4 and the side, bottom and top walls are continued forward from frame 4 by a smaller bellows 5 to a lens supporting frame designated generally at 6, which in turn supports a lens barrel 7 containing a lens.

The shutter supporting frame 4 is supported from the frame 1 by a bed plate 8 which is longitudinally slidably mounted between guide members 9 on each side of the frame 1. A rack 10 is secured to the bed plate 8 and engages with a pinion 11 mounted upon a shaft 12 having a knob 13 on the outer end thereof to permit of ready longitudinal adjustment of the shutter supporting frame 4. The bellows 3 permits such longitudinal adjustment while at the same time preventing ingress of light to the camera. The lens mount frame 6 is slidably supported upon an auxiliary bed plate 14 secured to and projecting forwardly from the shutter supporting frame member 4. Frame 6 is movable to provide for adjustments in focal length necessary with different lenses and the necessary adjustment is effected at the time a lens is changed. Thereafter, the frame 6 is locked in position by tightening a set screw 6a and all further focusing adjustments are made by advancing or retracting the bed plate 8 by means of rack 10 and pinion 11, the shutter frame 4 and lens supporting frame 6 being moved as a unit.

Attached to the rear of the box 1 is a revoluble back designated generally at 15, this back 15 comprising a frame having a flanged circular window in its forward face which engages with a circular window in the rear wall 16 of box 1. The revoluble back 16 contains a film supporting, moving, and numbering mechanism, an electric motor, and a commutator for controlling the operation of the entire camera. These features will be described in detail later.

The opening in the top of box 1 constitutes a window containing a ground glass focusing screen 17, and a movable mirror designated generally at 18 is hingedly mounted within the box 1 so that it is movable from the position shown in full lines in Figure 1, in which it reflects an image formed by the lens of the camera onto the focus screen 17, into an upper position as shown in dotted lines in Figure 1 in which it permits passage of the rays of light forming an image to a sensitive film supported within the back 15.

The general elements of my camera having been briefly outlined, the shutter mechanism, mirror mechanism, film supporting and moving mechanism, and the electrical control circuit for actuating the various elements will now be described in detail, considering each separately.

*Shutter mechanism*

Referring to Figures 1, 2, 3, and 4 of the drawings, the main frame work of the shutter mechanism comprises a partition 19 which is securely attached by screws or in any other desired manner to the frame member 4 and contains a rectangular aperture 20 therein for the light rays to pass through from the lens to the reflecting mirror 18, or to the sensitive film, as the case may be. In other words, the aperture 20 defines the shutter opening.

To close this opening, there are provided upper and lower movable screens 21 and 22 respectively. The upper screen 21 comprises a sheet of light, thin, opaque material such as aluminum fibre or bakelite, the edges of which fit in grooves in a pair of guide members 23 secured to the rear side of partition 19 closely adjacent the lateral edges of the aperture 20, the grooves serving not only to guide the upper screen 21 in a vertical plane, but also serving to form a light-tight seal therewith. Screen 21 is normally placed under tension tending to move it downward by a pair of flexible strips 24, the upper ends of which are secured to screen 21 and the lower ends of which wind about a spring roller 25, this roller being rotatably mounted in flanges 26 projecting rearwardly from the partition 19 and being placed under tension by a spring 27 therein, one end of which is attached to the roller and the other end of which is secured to an adjusting shaft 28 which may be turned to produce a desired tension on the slide 21 and then locked against reverse rotation by a ratchet wheel 29 on the end thereof, which engages with a pawl 30. When screen 21 is in its uppermost position, its lower edge is substantially even with the upper edge of aperture 20 and it is normally maintained in this uppermost position by a pair of latches 31 (referring to Figure 3), positioned adjacent opposite edges of the screen 21 and adapted to engage with a pair of projecting lugs 32 positioned respectively in the two upper corners of screen 21.

Thus, the latches 31 are secured at their lower ends to a transverse shaft 33 rotatably mounted on the partition 19 so that the upper ends of the latches are moved backwards or forwards as the case may be by rotation of the shaft 33. Referring now to Figure 1, the upper end of the right hand latch 31 (looking forwardly through the camera) is attached to the rear end of a rod 34 which extends through the partition 19 and through a solenoid 35 and terminates in a magnetic core 36 normally positioned just forward of the forward end of the solenoid. A helical spring 37, positioned between the forward end of solenoid 35 and a head 38 on the end of the magnetic core 36, normally maintains the core 36 and the rod 34 in a forward position in which the projecting shoulders of latches 31 lie in the path of movement of the lugs 32 on the upper screen 21 as the latter is raised. Therefore, upward movement of screen 21 will cause the lugs 32 to move past the latches 31, forcing the latter to rotate rearwardly; thereafter the latches 31 will be moved forwardly by the spring 37 to engage with the lugs and prevent the screen from being moved into lower position by the force of gravity and the pull of the spring roller 25. However, when the solenoid 35 is magnetized by passing an electric current therethrough, the magnetic core 36 is drawn into the solenoid 35, thus moving rod 34 rearwardly and rotating the latches rearwardly until they disengage from the lugs 32 and permit the upper screen 21 to snap into its lower position.

The lower screen 22, unlike the upper screen 21, is constructed of flexible material, such as fabric, adapted to be rolled about a lower spring roller 39, the latter being normally maintained under tension by a spring therewithin exactly as described in connection with the upper roller 25. The lower screen 22, like upper screen 21, moves in the guide slots in the members 23, and this screen is provided with a metal reinforcing strip 40 along its upper edge, the ends of this strip also extending into the grooves in the guide members 23. The lower edge of the upper screen 21 normally rests upon the upper edge of the strip 40 on the lower screen 22, and to insure a light-tight connection between these members their edges are rabbeted to overlap and thus prevent any direct passage of light therebetween. The lower screen 22, when released, is drawn down by spring roller 39 until its upper edge is substantially even with or below the lower edge of the aperture 20 in partition 19. On the other hand, when it is in its uppermost position the upper edge of the screen 22 is maintained substantially at or above the upper edge of the aperture 20 by a pair of latches 41 having hooks at their lower ends adapted to engage with lugs 42 extending rearwardly and laterally from the strip 40. Latches 41, like latches 31, are both secured to a common shaft 43 rotatably mounted upon partition 19, and the upper end of the left hand latch 41 (looking forwardly through the camera) is pivotally secured to a core 44 extending forwardly through an aperture provided therefor in frame 19 and slightly into a solenoid 45.

A spring 46, surrounding the core 44, normally maintains the upper end of latch 41 in rear position in which the lower ends of the latches are in position to engage with the lugs 42 and prevent downward movement of the lower screen 22. However, when the solenoid 45 is energized by passing an electric current therethrough, the core 44 is drawn into the solenoid thereby moving the lower ends of latches 41 rearwardly out of engagement with the lugs 42 and permitting the lower curtain to be snapped into its lower position below aperture 20 by the spring roller 39.

It will be observed from the foregoing description that when both screens are in their uppermost positions the upper screen 21 is retained in position above aperture 20 and the lower screen 22 is maintained in position juxtaposed to and closing aperture 20. The shutter may then be opened for focusing purposes by releasing the lower screen, thereby leaving aperture 20 clear; or an exposure of any desired length may be made by first releasing the lower screen 22 to open the aperture 20 and thereafter releasing the upper screen 21 to close the aperture. In either case, the shutter is reset by raising either or both of screens 21 and 22 by a mechanism now to be described.

The resetting mechanism comprises a horizontal cross bar 47 having a forwardly projecting lug 48 (Figure 4) adapted to engage with the under side of a lug 49 projecting rearwardly from the strip 40 forming the upper edge of the lower curtain 22. The outer ends of bar 47 are provided with extensions 50 which pass through slots in a pair of vertical tubular members 51, and are secured to the lower ends of plungers 52 positioned within tubes 51. Each of the plungers 52 has mounted thereon a plurality of cores 53 of paramagnetic material such as iron, these cores being spaced apart and progressively decreasing in length from the bottom to the top. Positioned about tubes 51 are a pair of solenoids 54, the lower ends of which are positioned substantially even with the uppermost or smallest segments 53 on plungers 52. When the shutter is to be reset, the solenoids 54 are energized by passing electric current therethrough and they thereupon successively attract the segments 53 on plungers 52, thus lifting the plungers and the cross bar 47 secured thereto, and the latter in turn lifts the top rail 40 through lugs 48 and 49 and raises the curtains into engagement with the latches 41 and 31 respectively. Upon the deenergization of the solenoids 54, the plungers 52 and the cross bar 47 drop back into their lowermost position, their fall being cushioned by spiral springs 55 positioned in the lower ends of tubes 51.

I provide plungers 52 with a plurality of paramagnetic segments 53 of progressively increasing size from top to bottom in order to obtain a greater movement of the cores 52 than could be obtained if they were provided with solid cores. Thus, if single solid cores were provided on each of the plungers 52 the cores would only be drawn into the solenoids 54 until the middle of the solid core was substantially at the middle of the solenoid. However, with the segmented core construction described, the plungers are urged strongly upwards by the magnetized solenoids until the lower segments 53 are well within the solenoids. This is for the reason that each segment 53, because of its increased size, is more strongly attracted by the associated solenoid than is the smaller segment immediately thereabove.

The resetting mechanism described acts directly only upon the lower screen 22. However, whenever the upper screen 21 is in released position its lower edge rests upon the upper edge of the roller screen 22. Therefore, upward movement of the lower screen necessarily carries the upper screen upward simultaneously.

From the foregoing description it is seen that I have provided a shutter that can be set by one electrically actuated device, opened by another electrically actuated device, and closed by a third electrically actuated device, and that by regulating the relative time of actuation of the second and third devices an exposure of any desired time length may be had. The actual operation of these various devices will be explained later in connection with the complete operation of my camera.

*Mirror actuating mechanism*

Figure 5:
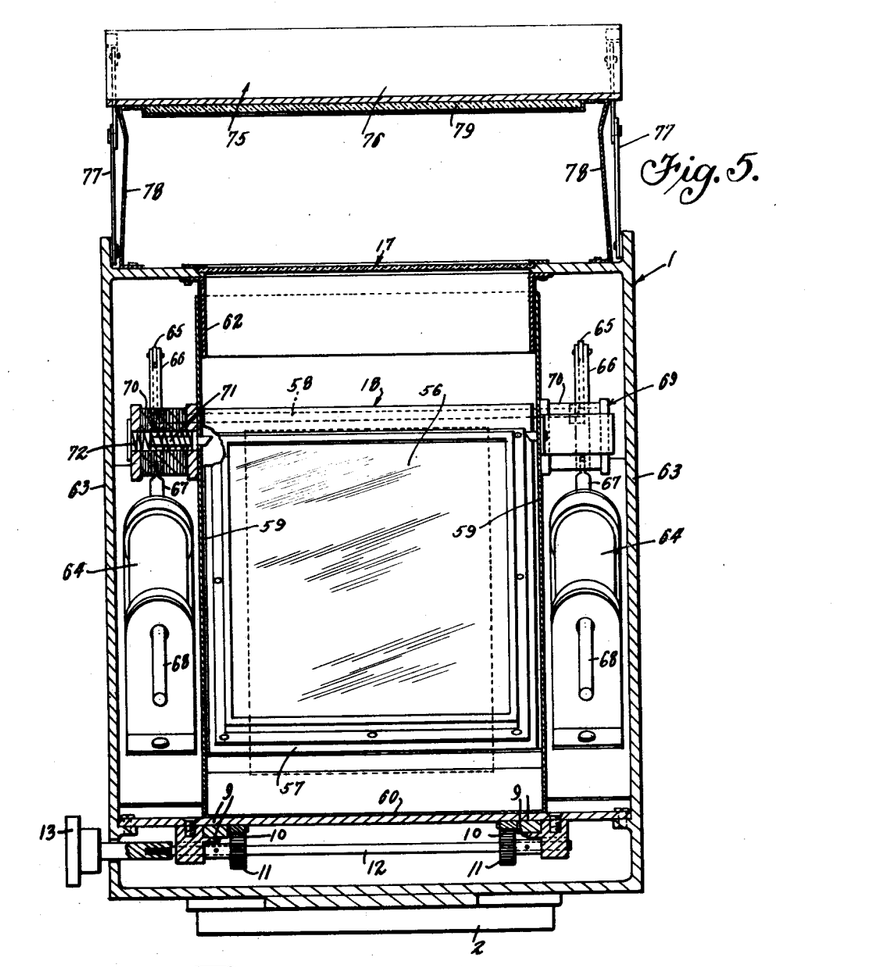
Figure 5 is a detail front elevational view of the focusing mirror and associated mechanism the direction and position of the view being shown by the line V—V in Figure 1.

The mirror mechanism, designated generally at 18 in Figure 1, for reflecting image rays onto the focusing screen 17, comprises a mirror 56 mounted upon a sheet metal plate 57 which is hinged at its upper end to rotate with a shaft 58. Referring now to Figure 5 shaft 58 is journalled in side walls 59 forming part of an inner box-like frame, the latter being positioned within the box 1 and having a short base portion 60 secured to the bottom of box 1 as shown in Figure 1. The lower portion of the inner box rearwardly of the base portion 60 extends upwardly at a 45° angle and is provided with an aperture therein somewhat larger than the mirror 56. The wall containing this aperture is provided with flanges 61 extending into the aperture, upon which the mirror supporting plate 57 rests when in its lowermost position. When in its lowermost position, the mirror supporting plate 57 seals with the flanges 61 to provide a light-tight connection and thereby prevents any light entering through the lens or through the focusing screen 17 from reaching the sensitive film at the back of the camera.

The side walls 59 of the inner box extend substantially to the top of the box 1 in which it is positioned, and a flange 62 extends downwardly from the edges of the focusing screen 17 to prevent any light entering through the focusing screen from reaching the sensitive film at the back of the camera. As is readily apparent from inspection of Figure 1 the upper edges of the inner box within which the mirror is mounted extend upwardly around the downwardly extending shield 62 so that it is impossible for light to pass directly from the focusing screen 17 to the back of the camera.

Referring now to Figure 5, the side walls 59 of the box containing the mirror mechanism 18 are positioned some distance inwardly of the side walls 63 of the outer box designated generally at 1, thus providing room for the mounting of a pair of mirror lifting solenoids 64, these solenoids being secured to the laterally extended edges of the inclined bottom wall forming the mirror bed. The shaft 58, to which the mirror supporting plate 57 is attached at its upper edge, extends through the side walls 59 as previously described and has attached thereto at each end an arm 65 (Figure 1), each of which is secured by a link 66 and a rod 67 to a magnetic core member 68. Each of the cores 68 is slidable within its associated solenoid 64, and the rods 67 pass through the solenoids and the cores 68 project below the solenoids when the mirror is in lowermost position, all as shown in Figure 1. However, when the solenoids 64 are energized by passing electric current through them the magnetic cores 68 are drawn within the solenoids, thus shifting rods 67 and links 66 upwardly and forwardly to rotate the arms 65 and the shaft 58, thereby swinging the mirror supporting plate 57 upward into substantial horizontal position. To retain the mirror supporting plate 57 in its uppermost position, a pair of electrically operated latches designated generally at 69 are provided. Referring to Figure 5, each of the latches 69 comprises a solenoid 70 secured to the outside of one of the side walls 59 and containing an iron core 71 which normally projects through an aperture provided therefor in wall 59 and into the path of the mirror supporting plate 57.

Each of cores 71 is normally urged inwardly by a coil spring 72 and is provided with a beveled lower edge so that when the mirror supporting plate 57 moves upward therepast, it forces the cores 71 outwardly against the compression of springs 72 until plate 57 has moved past the cores; the latter are then forced inwardly into their normal positions by springs 72 in which positions they engage the under edges of plate 57 and prevent it from dropping back. The two solenoids 70 positioned on either side of the camera are connected to the same control circuit and are actuated simultaneously by the automatic control apparatus to be described later. The mirror lifting solenoids 64 are likewise connected to the same control circuit and are actuated simultaneously by the control mechanism. At this point in the description, it is sufficient to notice that energization of solenoids 64 lifts the mirror 56 into uppermost position, and that it is thereafter retained in uppermost position by the electric latches 69 until the solenoids 70 associated with the latter are energized, whereupon the mirror is dropped back into its lower position.

To prevent any possible leakage of light from the focusing screen 17, about the mirror supporting plate 57 to the sensitive film in the back of the camera when the mirror is raised into uppermost position, downwardly depending side walls 73 (Figure 1) are attached to the mirror supporting plate 57 on either side.

Figure 6:
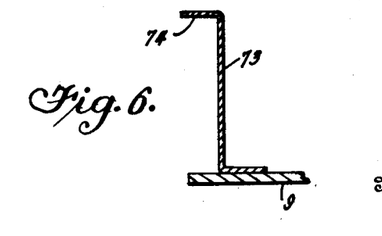
Figure 6 is a detail sectional view of an element of the mirror mechanism taken in the plane VI—VI of Figure 1.

These plates form a light-tight joint with the plate 57 along their edge of contact therewith and are closely spaced from the inside surfaces of the walls 59. They are provided with outwardly extending flanges 74 (Figure 6) along their forward edges to form a light trap to prevent any light that might find its way forwardly between a wall 59 and the associated wall 73 from escaping past flange 74 and impinging upon the sensitive film at the back of the camera.

During normal operation of the camera the photographer will observe the focusing screen 17 directly. To increase the visibility of the image on focusing screen 17, a hood designated generally at 75 is provided to shield the screen 17 from extraneous light to as large an extent as possible, this shield comprising a hinged top plate 76 normally supported by an articulated arm 77 from the top of box 1, and provided with telescoping sides 78. It is apparent that the photographer can only observe the focusing screen 17 directly when the camera is positioned substantially below the elevation of his head. To permit the use of the focusing screen when the camera is in a higher position, an auxiliary mirror 79 is provided on the under side of the hood plate 76, to reflect the image produced on the focusing screen 17 directly rearwardly so that it can be observed by a photographer whose eyes are substantially on a level with the mirror 79.

*Film supporting and moving mechanism*

Referring for the moment to Figure 1, the entire film holding and shifting mechanism and the electric mechanism for controlling the actuation of the camera, is mounted upon or within a frame 15 which is removable as a unit from the box 1. Thus, (Figures 1 and 11) the rear wall 16 of box 1 is provided with a circular aperture therein and the front wall 80 of the frame 15 is provided with an annular ring 81 adapted to fit snugly within the circular aperture in plate 16. To lock the frame 15 to the box 1, the annular ring 81 is so dimensioned as to project inwardly within the walls 16 and is provided with a circumferential groove 82 lying just within the wall 16, which groove is engaged by a pair of locking arms 83, each of which is pivoted at one end by a pivot 84 to the wall 16 and is connected by a link 85 at its opposite end to a nut 86 which is threaded upon a screw 87 projecting inwardly from the side of box 1 and having a knob 88 on its outer end exterior of box 1. Screw 87 is provided with a left hand thread, so that when knob 88 is turned to the left, the links 85 move the locking arms 83 outward away from the groove 82 in the annular ring 81; the back 15 of the camera may then be removed bodily from box 1 or may be rotated 90° to take a horizontal or a vertical picture as desired. The back 15 then may be locked into position by rotating knob 88 to the right, which moves the nut 86 inwardly and retracts the lock arms 83 into the groove 82 on ring 81, thereby clamping the latter firmly in position.

It will be observed that if the back 14 is only to be rotated from a horizontal to a vertical position, or vice versa, the knob 88 need only be turned sufficiently to release the tension on the lock arms 83; the latter then still engage the groove 82 and prevent the back 15 from falling away from box 1 but permit the back to be rotated with respect to the box.

Figures 10, 11, 12, 13:
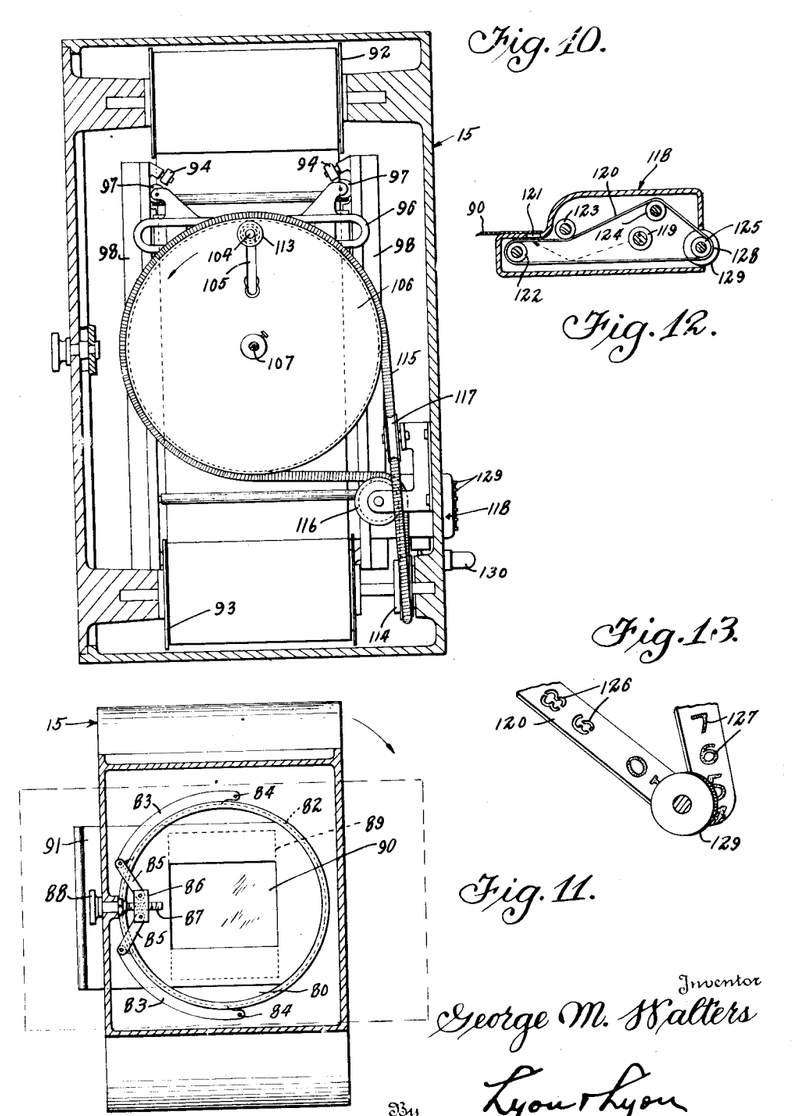
Figure 10 is a broken view of the film shifting mechanism taken along the line X—X of Figure 1.
Figure 11 is a vertical sectional view taken in the line XI—XI of Figure 1, showing the back locking mechanism.
Figure 12 is a detail sectional view of the film numbering mechanism taken in the plane XII—XII of Figure 7.
Figure 13 is a perspective view showing one of the tapes of the numbering mechanism.

The front wall 80 of back 15 (Figures 1 and 11) is provided with an aperture 89 therein immediately back of which the sensitive film 90 is mounted. The aperture 89 is rectangular in shape as shown in Figure 11 and is normally of the dimensions of the largest size picture to be taken by the camera. However, I provide means for taking pictures of reduced dimensions, which means comprises slides 91, slidable in grooves in the front plate 80, which slides may be moved inwardly to decrease the longitudinal dimensions of the aperture 89 as clearly shown in Figure 11.

My camera is adapted for the use of roll film and this film is fed from a feed spool 92 positioned in one end of the back 15, down past the aperture 89 in the front wall plate 80, and is thereafter wound onto a take-up spool 93 positioned in the opposite end of back 15. After leaving spool 92 the film 90 is guided into the focal plane of the camera, which lies immediately back of the aperture 89, by guide rolls 94 and 95 respectively, rolls 94 being positioned adjacent the feed spool 92 and rolls 95 being positioned adjacent the take-up spool 93.

Figure 7:
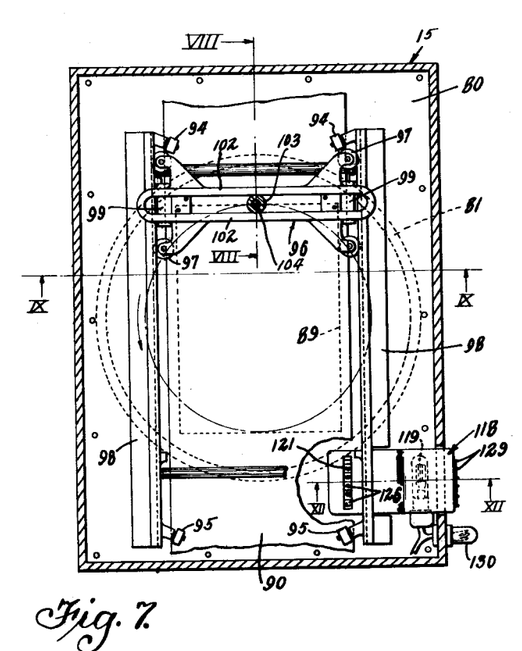
Figure 7 is a rear elevational view of the film holding, film shifting and film numbering mechanism, the position and direction in which the view is taken being shown by the line VII—VII in Figure 1.

As is clearly shown in Figure 7, these rolls 94 and 95 contact only with the margins of the film and are set at an angle such that as the film is drawn thereunder it is stretched laterally to maintain it in taut condition.

After each exposure is made on film 90 it is necessary to shift the film a distance equal to or slightly greater than the length of the picture taken, in order to bring a fresh length of film into position for the next exposure. To effect movement of the film, I provide a carriage designated generally at 96 (Figures 7, 8, and 9), this carriage being provided with a pair of rollers 97 on each side which engage in grooves in guide members 98 secured to the plate 80 forming the front wall of case 15. Carriage 96 is therefore freely movable longitudinally in a path directly back of the film 90 and by providing clutch means on carriage 96 for engaging with the film 90 whenever the carriage moves in one direction, the film may be moved with the carriage. The means for gripping the film comprises (Figure 8) a U-shaped member 99 on each end of the carriage 96, these members each projecting forwardly from the carriage past the edges of the film and then being bent inwardly to form a shoulder engageable with the front side of the film margin. The shape of members 99 is clearly observable in Figure 9 and it will be noted that they engage only that portion of the margin of the film which extends laterally beyond the rearwardly projecting flange defining the aperture 89.

Referring again to Figure 8, there is pivoted to each member 99 a detent 100 which is normally forced into engagement with the rear surface of the margin of the film by a spring 101. When the carriage 96 is moved upwardly (referring to Figure 8), the cam 100 is deflected against the pressure exerted by spring 101 and slips past the film. However, on the return stroke when carriage 96 moves in the opposite direction, the cams 100 firmly engage the film and lock it against movement relative thereto so that the film is carried along with the carriage. Therefore, when the carriage 96 is reciprocated from its lower position upwardly and then back down to its lower position, it will move upwardly without moving the film 90, but on its subsequent downward movement it will carry the film 90 with it, thus displacing the film by the length of a picture and bringing an unexposed section of film across the aperture 89.

To shift the carriage 96, the latter is provided with a pair of lateral guide members 102, between which there is positioned a roller 103 rotatably mounted upon a shaft 104 which is secured within a radial slot 105 (Figure 10) in a disk 106 mounted upon a shaft 107 (Figure 1) journalled in an inwardly projecting bearing 108 formed integrally with the rear wall 109 of the back 15. Shaft 107 projects through the rear wall 109 and has a gear wheel 110 (Figure 14) on its rear end meshing with a worm 111 on the shaft of a motor 112. It will be observed, therefore, that when the motor 112 is operated, it rotates the shaft 107 and the disk 106, thereby revolving the roller 103 and reciprocating the carriage 96 once during each revolution of the disk 106.

Figure 8:
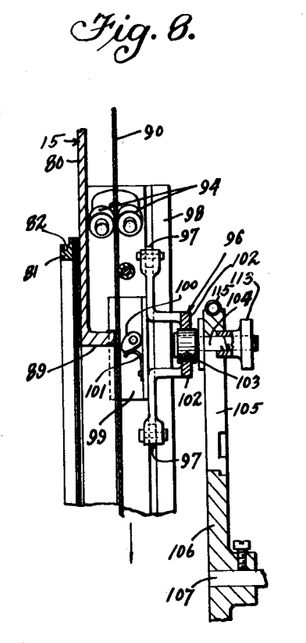
Figure 8 is a detail sectional view of the film holding and film shifting mechanism taken in the plane VIII—VIII of Figure 7.
Figure 9:
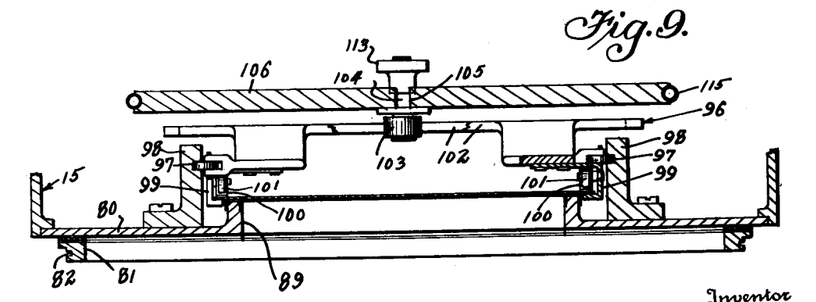
Figure 9 is a horizontal sectional view through the film shifting mechanism taken in the plane IX—IX of Figure 7.

As shown in Figure 8, the roller supporting shaft 104 is normally fixed in a desired position in slot 105 by means of a thumb nut 113. By loosening thumb nut 113 however, shaft 104 may be adjusted into various radial positions within slot 105 to reduce the stroke of carriage 96 when pictures of reduced length are to be taken.

To flexibly drive the take-up spool 93, the latter is provided on one end with a pulley 114 (Figures 1 and 10) which is connected by a flexible belt 115 to disk 106, the latter being provided with a peripheral groove to receive the belt 115. Guide-pulleys 116 and 117 serve to guide belt 115 from pulley 114 to disk 106. Disk 106 is of substantially larger diameter than pulley 114; it therefore tends to drive the take-up roller 93 at a speed considerably greater than that necessary to take up the slack film as it is fed by the carriage 96. Belt 115, however, as previously indicated, is of flexible nature; thus it may consist of a helical spring, and, as a result, constantly creates a winding tension on the roll 93 while at the same time slipping with respect to pulley 114 when the tension exceeds the value necessary to properly take up the film.

It is very desirable in a studio camera to number or otherwise identify each exposed film so that it can be properly identified after it has been developed. To this end, I provide a numbering device in a case 118 as illustrated in Figures 7, 12, and 13. This numbering device comprises a light-tight box containing an electric lamp 119 and a plurality of numbering tapes 120. Case 118 is provided with a window 121 and the case is so positioned as to bring window 121 immediately in front of the film 90. As shown in Figure 12, each of the tapes 120 is movably supported on rollers 122, 123, 124, and 125, and each tape 120 is provided with numbers cut therethrough, as indicated at 126, on one portion of its length, and with numbers printed on the exterior of another portion of the tape as indicated at 127. The stenciled and printed numbers are so positioned that when a printed number is exposed at point 128, the corresponding stenciled number is juxtaposed to window 121. All of the rollers 122, 123, 124 and 125 are independently movably mounted on shafts extending through the case 118 so that any tape can be moved without shifting the other tapes. Furthermore, each roll 128 is provided with a knurled rim extending from the edge thereof as shown at 129 in Figure 7 to permit rotation of the associated roll 125 to move the tape 120 supported on that roll into any desired position. Thus, by shifting the various wheels 125 and observing the printed number appearing at point 128 any desired stenciled number may be set up below the window 121.

In operation, a desired number to be printed on a film is set up in the manner described and later, after the exposure is taken, current is momentarily applied to the electric lamp 119; the light from this lamp is reflected back and forth within the container 118 and some of it shines through the stenciled letters positioned across window 121 to imprint upon the film the number that has been set up. The energizing circuit for lamp 119 will be described later in connection with the complete operation of my camera.

It will be observed from Figure 7 that numbering device 118 is positioned below the aperture 89; therefore, the numbering device is not illuminated at the time an exposure is taken, but later, after the film has been moved to bring the margin of the exposed portion opposite the numbering device. The timed operation of the numbering and film moving mechanisms will be described later.

To indicate whether or not the lamp 119 is functioning properly, I preferably provide a pilot lamp 130 which is positioned on the exterior of the back 15 and is connected in series with the number exposing lamp 119 within the case 118.

*Electric control mechanism*

Figures 14, 15, 16, 17:
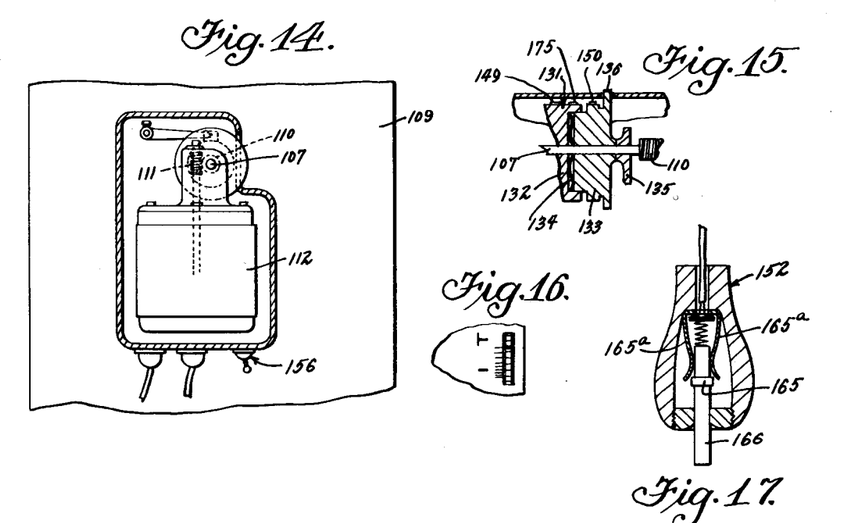
Figure 14 is a vertical sectional view in the plane XIV—XIV of Figure 1 showing the driving motor and the exposure adjusting mechanism.
Figure 15 is a horizontal detail sectional view of the motor and commutator mechanism taken in the plane XV—XV of Figure 1.
Figure 16 is a detail view showing the exposure adjusting wheel and the adjacent portion of the housing.
Figure 17 is a sectional view showing a push button for use with my camera.

It is apparent from the foregoing description that I have provided a camera having a shutter that is set, opened and closed by three independent electrically operated devices; a focusing mirror that is raised into position to take a picture and subsequently released for focusing by two independent electrically operated devices; a film moving device that is actuated to shift the film once during each revolution of a motor driven shaft; and a film numbering mechanism that is actuated by closing an electric circuit. Therefore, all of the operations of the camera can be performed by closing electrical circuits to the various electric devices in proper timed sequence relative to the rotation of the shaft 107 for moving the film. I provide means for this purpose which comprises a commutator designated generally at 131 in Figure 1, and illustrated in detail in Figures 15, 16, and 18. Thus, referring to Figure 1, commutator 131 comprises a drum 132 of insulating material, mounted upon shaft 107 for rotation therewith, and an auxiliary insulated drum 133 mounted coaxially with drum 132 and normally rotatable therewith, although separately adjustable. Thus, referring to Figure 15, the drum 133 is mounted loosely upon shaft 107, but is in frictional engagement with drum 132 through a spring washer 134, drum 133 being maintained in position to compress spring washer 134 against drum 132 by a thrust bearing 135 secured to the housing containing the motor 112, the worm 11, and the gear 110 (Figure 14). Because of the friction introduced between drums 132 and 133 by the spring washer 134, the drum 133 normally turns with the drum 132 but it can be shifted with respect to drum 132 when desired, by moving a knurled rim 136 which projects through the motor housing as shown in Figures 15 and 16.

When the motor 112 is energized, it rotates the shaft 107 and the disk 106 as previously described to shift the carriage 96 upwardly during the first half revolution of shaft 107, and shift the carriage 96 downwardly to move the film into position for a new exposure during the last half revolution of shaft 107, the commutator 131, being mounted upon shaft 107, turns therewith and various segments on commutator 131 cooperate with various brushes to close various electric circuits to control the operation of the shutter and the focusing mirror mechanism to make an exposure during the first half revolution, or first half cycle of movement, of shaft 107. The complete operation of the camera will be readily apparent with reference to Figure 18 which discloses schematic wiring diagram of the entire device, and shows the relative positions of the various segments on the commutator 131. Thus, in Figure 18, the commutator 131 has been shown as it would appear developed. In other words, during one complete revolution of the shaft 107, the developed surface of the commutator 131 as shown in Figure 18 would move upward past the associated brushes and at the end of the revolution would be left in exactly the position shown.

Figure 18:
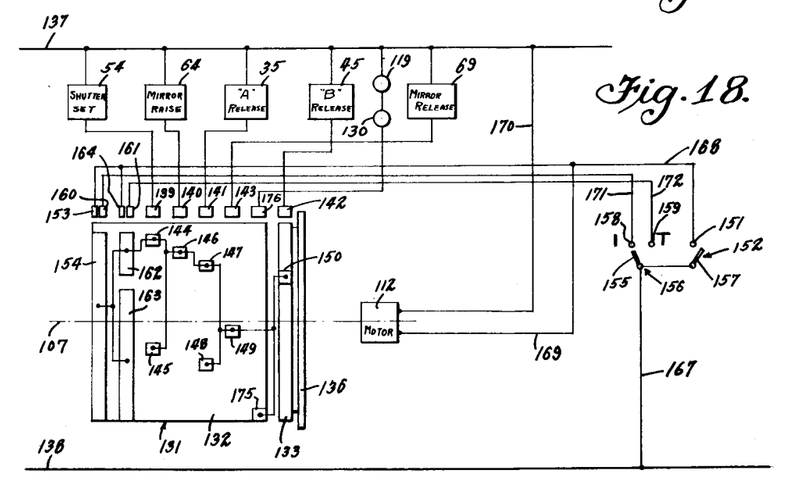
Figure 18 is a schematic wiring diagram of the electrical circuit of my camera.

In Figure 18, 137 and 138 respectively, indicate the two sides of a circuit connected to any source of electricity for supplying actuating current for my device. One side of the circuit 137 is connected to one terminal of the shutter-setting solenoids 54, the mirror-raising solenoids 64, the release solenoid 35 for the lower shutter screen 22, the release solenoid 45 for the upper shutter screen 21 and the mirror release solenoids 69, and to one side of the numbering lamps 119 130, which, as previously indicated, are connected in series. The other terminal of the shutter-setting solenoids 54 is connected to a brush 139; the other side of the mirror-raising solenoids 64 is connected to a brush 140; the other side of the shutter lower curtain release solenoid 35 is connected to a brush 141; the other side of the shutter upper curtain release solenoid 45 is connected to a brush 142; the other sides of the mirror release solenoids 69 are connected to a brush 143; and the other side of the numbering and pilot lamps 119 and 130 is connected to a brush 176. Brushes 139 to 142 inclusive are associated with various segments 144, 145, 146, 147, 148, 149 and 150 on the commutator 131 as shown and these segments are all connected together as indicated.

The motor 112 has one terminal connected by a conductor 170 to lead 137 as shown and has its other terminal connected both to one contact 151 of a manually controlled switch 152 and to a brush 153 associated with a long segment 154 on commutator 131. The other side 138 of the current supply circuit is connected to a movable arm 155 on a manually controlled switch 156 and also to the movable arm 157 of the manually controlled switch 152. Fixed contacts 158 and 159 associated with the movable arm 155 of switch 156 are connected respectively to a brush 160, associated with commutator segment 154, and with a brush 161 associated with a pair of commutator segments 162 and 163. A second brush 164 also cooperating with segments 162 and 163 is connected to brush 153 and to the switch contact 15. The operation of the aforementioned electric circuit can be most readily understood by following through the complete operation of my camera.

Assume that the commutator is in the position shown in Figure 18, that the shutter has been set by moving both the upper and the lower screen into their uppermost positions and subsequently opened by releasing the lower screen. Assume, further, that the focusing mirror 56 is in its lowered position as shown in Figure 1, thus reflecting an image of the subject to be photographed upon the focusing screen 17. The photographer will then focus the camera by adjusting the lens barrel 7 and shutter supporting plate 4 backwardly and forwardly by means of the rack 10 and pinion 11 while observing the image on focusing screen 17.

When he has the image properly centered and focused he sets the shutter for a time or an instantaneous exposure, as the case may be, by adjusting the knurled rim 136 (Figures 15 and 16) to shift the commutator drum 133, bearing segment 150, into the proper position relative to the commutator drum 132. Let us assume that an instantaneous exposure is to be made and that the drum 133 is set to bring segment 150 into the position shown in Figure 18. The photographer then observes the subject and when he obtains a desired pose or expression, he makes the exposure by closing the manually operated switch 152 (since an instantaneous exposure is to be made the manually operated switch 156 will have been previously moved into contact with contact 158, which, as shown in Figure 18, is identified by the letter "I" to indicate instantaneous exposure). The switch 152 will commonly comprise a portable push button on the end of a cord as shown in Figure 17, the push button comprising a pair of contact springs 165a connected to the two sides of the circuit and adapted to be closed by a metal ring 165 on the push button 166 when the latter is depressed.

Closing of the switch 152 (which closure is preferably only momentary) closes a circuit for connecting current supply main 138, through conductors 167, switch 152, conductor 168, conductor 169, through the motor 112, and through conductor 170 to the other side 137 of the current supply circuit. Motor 112 thereupon begins to rotate and simultaneously rotates the shaft 107 and the commutator drums 132 and 133.

Initial slight rotation of the commutator brings segment 154 into contact with brushes 153 and 160. This immediately closes a circuit from the supply conductor 138 through conductor 167, switch 156, conductor 171, and brush 160 to segment 154, and since all the remaining segments on the commutator are connected to segment 154 they are likewise all connected to the supply lead 138. Segment 154 at the same time connects with brush 153 and completes a second circuit from conductor 138 to conductor 169 independently of the manually controlled switch 152 so that the motor 112 is continually energized until the shaft 107 and commutator 131 complete a revolution when contact is again broken between segment 154 and brushes 153 and 160. Therefore, it will be seen that when the switch 155 is closed on contact 158 for an instantaneous exposure, only a momentary closure of switch 152 is sufficient to start the motor 112 into operation and cause it to automatically continue running until the commutator 131 has completed a revolution.

During the rotation of commutator 131, and shortly after contact of brushes 153 and 160 with segment 154, brush 139 contacts with segment 144 thereby closing a circuit from brush 139 to the supply conductor 138 and setting up a flow of current through the shutter-setting solenoids 54 to raise the lower screen (which had previously been lowered to permit focusing) into uppermost position. Shortly thereafter, the continued rotation of commutator 131 brings segment 146 into contact with brush 140, thereby closing an electric circuit from supply main 138 through the mirror raising solenoids 64 and energizing the latter to raise the mirror into its uppermost position.

Continued rotation of commutator 131 thereafter brings segment 147 into contact with brush 141 which closes the actuating circuit for, and energizes the lower shutter release solenoid 35, thereby opening the shutter and beginning the exposure of the film. Further continued rotation of the commutator 131 subsequently brings segment 150 into contact with brush 142 which supplies current to energize the shutter upper curtain release solenoid 45, to drop the latter and thereby close the shutter and end the exposure. All of the foregoing operations take place during the first half revolution of shaft 107, commutator 131 and the disk 106. During this half revolution, disk 106 has moved the carriage 96 upwardly but has not shifted the film. However, during the second half revolution of shaft 107 disk 106 shifts the carriage to move a fresh length of film into position and the simultaneous movement of the commutator 131 performs the following operations while the film is being moved: (1) segment 149 of the commutator contacts with brush 143 to energize the mirror release solenoids 69, thereby dropping the mirror into its lower position ready for focusing another picture; (2) shortly thereafter, segment 145 contacts with brush 139 to again energize the shutter-setting solenoids 54, thereby raising both the upper and the lower shutter screens into their uppermost positions in which the upper screen is positioned above the shutter aperture and the lower screen is juxtaposed thereto; (3) thereafter, further movement of commutator 131 brings segment 148 into contact with brush 141 to again energize the lower screen release solenoid 35, which drops the lower screen below the aperture in the shutter and leaves the latter in open condition for focusing the next picture; (4) final movement of the commutator momentarily brings segment 175 into contact with brush 176 and simultaneously flashes the film marking lamp 119 and the pilot lamp 130, to print the number set up on the stencil rolls 120 on the margin of that portion of the film just exposed.

It will be observed from the foregoing description of the sequence of operation of the various elements, that the timing of an exposure is dependent upon the time elapsing between contact of segments 147 and 150 with their respective brushes 141 and 142. This time can be very accurately regulated by using a substantially constant speed motor to drive the mechanism, and such motors are readily available. Furthermore, the time of exposure can be varied within limits by shifting the commutator drum 133, carrying segment 150, relative to the rest of the commutator. Thus, segment 150 may be adjusted to contact with its brush very shortly after the segment 147 contacts with brush 141 thus giving a very short exposure. On the other hand, by shifting segment 150 a substantial distance below segment 147 the time of exposure can be materially increased.

Time exposures of any desired length can also be obtained with my device by the following mode of operation:

Switch 156 is set to bring the movable contact 155 against the fixed contact 159, which is identified with the letter T indicating a time exposure. This closes a circuit from main 138, through conductor 167, and conductor 172, to brush 161. Therefore, when the motor is first set into operation by momentarily closing switch 152, segment 150

162 will contact with brush 161 and will be thereby energized precisely as previously described in connection with the operation of segment 154 and brush 160. Likewise, current will be supplied to continue the operation of motor 112 through brush 164 and lead 169 and the mechanism will function exactly as previously described up to and including the movement of segment 147 into contact with 141 to energize the shutter lower curtain release solenoid 35 and open the shutter. Immediately thereafter, however, brushes 164 and 161 run off the short segment 162, thus breaking the energizing circuit 112 and stopping it. The mechanism is thereby stopped with the shutter in opened position and an exposure will be commenced and will continue so long as the motor remains idle. When the exposure has been continued as long as desired, the photographer again manipulates the push button 152 to momentarily close the energizing circuit for motor 112 and again set the latter into motion.

Slight further movement of the motor 112, following the second actuation, brings the long segment 163 into contact with brushes 161 and 164, thereby insuring the continued running of the motor until the cycle is completed and the continuation of the cycle of movement closes the shutter by releasing the shutter upper curtain precisely as described in the original operation.

In the foregoing operation, the method of taking a time exposure by twice actuating the push button switch 152 was described. However, this same operation may also be effected by making what is known as a bulb exposure, that is, depressing the push button 166 (Figure 17) as far as it will go and holding it in that position until the end of the exposure and then releasing it. The initial movement of the button 166 carries the metal collar 165 past the springs 165a thereby momentarily engaging with them long enough to set the motor into operation but thereafter breaking connection with springs 165a so that the motor stops when segment 162 on the commutator is carried past brushes 161 and 164. However, subsequent release of the push button 166 again momentarily brings the metal collar 165 into contact with the springs 165a and again sets the motor into operation.

As previously indicated, instantaneous exposures of various lengths may be had by adjusting the knurled wheel 136 to shift the commutator segment 150. However, the range of movement of segment 150 is limited to a distance extending from segement 147 to segment 149. (The latter serving to release the mirror associated with the focusing screen.) As shown in Figure 16, the range of movement for instantaneous exposures of various lengths is indicated by a scale. When a time exposure is to be made, the adjusting wheel 136 is moved to a position slightly beyond the segment 150 well below the shutter opening segment 147 to insure that segment 150 will not contact with its brush before the initial movement of the commutator is completed.

I claim:

1. A camera having a lens mount at one end and a means for supporting a photo-sensitive film at the other end, a shutter comprising a light-tight partition having an aperture therein positioned between said lens mount and said film, means for closing said aperture, means for shifting said lens mount with respect to said shutter and for locking it against movement relative to said shutter, and means for longitudinally shifting said shutter and lens mount as a unit with respect to said film.

2. A camera having a lens mount, a film support and a shutter positioned between said lens mount and said film support, said shutter comprising a light-tight partition having an aperture therein, a pair of screens, one of said screens being movable from a position juxtaposed to said aperture to a position therebelow, and the other screen being movable from a position juxtaposed to said aperture to a position thereabove, means for simultaneously moving both screens into their respective uppermost positions, means constantly urging said screens into their lowermost positions, and a pair of separately releasable latching means for independently normally retaining said respective screens in uppermost position, and means for independently releasing the respective means of said last pair.

3. A camera having a lens mount, a film support and a shutter positioned between said lens mount and said film support, said shutter comprising a light-tight partition having an aperture therein, a pair of screens, one of said screens being movable from a position juxtaposed to said aperture to a position therebelow, and the other screen being movable from a position juxtaposed to said aperture to a position thereabove, means for simultaneously moving both screens into their respective uppermost positions comprising a pair of solenoids mounted upon said partition on opposite sides of said aperture, magnetic cores for said solenoids normally positioned therebelow and slidably supported for movement into said solenoids, means for connecting said cores together, and means on said screens engageable with the top of said last-named means whereby upward movement of the latter raises said screens into their uppermost positions, means for energizing said solenoids to lift said cores, means constantly urging said screens into their lowermost positions, and a pair of separately releasable means for independently normally retaining said respective screens in uppermost positions, and means for separately releasing said last pair of means.

4. A device as described in claim 3 further characterized in that each of said cores comprises a plurality of spaced-apart bodies of paramagnetic material, which bodies increase progressively in dimensions from top to bottom whereby the working strokes of said cores relative to said solenoids are increased.

5. A camera having a lens mount, a film support, and a shutter positioned between said lens mount and film support, said shutter comprising a light-tight partition having an aperture therein, a pair of screens, one of said screens being movable from a position juxtaposed to said aperture to a position therebelow, and the other screen being movable from a position juxtaposed to said aperture to a position thereabove, means for simultaneously moving both screens into their respective uppermost positions, means constantly urging said screens into their lowermost positions, a pair of latches for normally engaging with and retaining said respective screens in their respective uppermost positions, and a pair of electro-magnetic means for independently releasing the respective latching means associated with the lower and the upper of said two screens in succession, and means for successively energizing said pair of electro-magnetic means.

6. A camera having a lens mount, a film support and a shutter positioned between said lens mount and film support, said shutter comprising a light-tight partition having an aperture therein, a pair of screens, one of said screens being movable from a position juxtaposed to said aperture to a position therebelow, and the other screen being movable from a position juxtaposed to said aperture to a position thereabove, means for simultaneously moving both screens into their respective uppermost positions, means constantly urging said screens into their lowermost positions, a pair of latches for normally engaging with and retaining said respective screens in their respective uppermost positions, and a pair of electro-magnetic means for independently releasing the respective latching means associated with the lower and the upper of said two screens in succession, a source of current for energizing said electro-magnetic means, commutator means for successively connecting said source to said electro-magnetic means, and motor means for driving said commutator at a predetermined speed whereby it trips said lower and upper screens at predetermined timed intervals.

7. A device as described in claim 6 in which said commutator comprises two separate segments and two separate brushes cooperating with said separate segments, one of said segments and its associated brush functioning to close an actuating mechanism for the electro-magnetic means for releasing said lower screen, the other segment and associated brush functioning to close an electric circuit for actuating the electro-magnetic means for releasing said upper screen, said last-named segment being adjustable relative to said first segment whereby the time between the release of said lower shutter and the release of said upper shutter may be varied.

8. A camera having a lens mount, a film support, and a shutter positioned between said lens mount and film support comprising a light-tight partition having an aperture therein, a pair of screens, one of said screens being movable from a position juxtaposed to said aperture to a position therebelow, and the other screen being movable from a position juxtaposed to said aperture to a position thereabove, electro-magnetic means for simultaneously moving both screens into their respective uppermost positions, means constantly urging said screens into their lowermost positions, a pair of independently operable electro-magnetic means for releasably retaining said respective screens in their uppermost positions, a source of current for energizing said electro-magnetic means, commutator means for successively connecting said source to said electromagnetic shutter setting means, said lower screen releasing means and said upper screen releasing means, and motor means for driving said commutator at a predetermined speed whereby it sets said shutter and subsequently trips said lower and upper screens at predetermined timed intervals.

9. In a camera having a lens mount at one end, a film mount at the other end, a shutter back of the lens mount, a focusing screen in front of the film mount positioned at an angle to the film mount, an image reflecting mirror in front of the film mount movably supported to swing into and out of the path of light between said lens mount and film mount, electrically operated means for setting said shutter, electrically operated means for opening said shutter, electrically operated means for closing said shutter, a fourth electrically operated means for lifting said mirror, and a fifth electrically operated means for releasing said mirror, a source of electric current, a commutator for selectively connecting said source to said various electrically operated means, motor means for driving said commutator through a complete cycle of operation at a predetermined speed, said commutator having segments so positioned and connected as to apply current to said shutter setting means, mirror raising means, shutter opening means, shutter closing means, mirror releasing means, shutter setting means, and shutter opening means in timed succession during each cycle of operation.

10. In a photographic camera a film mount comprising a feed spool, a take-up spool, guide means for guiding a film during passage from said feed spool to said take-up spool, and for maintaining it in flat condition during its passage therebetween, a carriage reciprocable longitudinally adjacent the path of movement of said film, means on said carriage for gripping the edges of said film in response to movement of the carriage from said feed spool toward said take-up spool and for releasing the edges of said film while moving in the opposite direction, an element rotatable about an axis substantially perpendicular to and centrally positioned with respect to the plane of movement of said carriage, crank means on said element spaced from said axis, guideways on said carriage extending laterally thereacross for engaging with said crank means, and means for rotating said element through one complete revolution about said axis whereby said carriage is reciprocated to shift said film the length of a picture, and is then restored to normal position.

11. A device as described in claim 10 in which slip drive means is provided between said rotatable element and said take-up spool whereby said take-up spool is flexibly driven simultaneously with the reciprocation of said carriage to wind up slack film on said take-up spool as the film is moved by said carriage.

12. A device as described in claim 10 in which said crank means is adjustably mounted on said rotatable element for radial adjustable movement with respect to the axis of said element to vary the length of the path of movement of said carriage and the length of film fed during each cycle of operation.

13. A studio camera comprising a shutter, separate electrically operated devices for setting, opening, and closing said shutter respectively, a film moving mechanism comprising a linearly movable carriage having means for clamping a film in response to movement in one direction and for releasing the film in response to movement in the opposite direction, a shaft, a crank revoluble with said shaft, means linking said crank to said carriage to reciprocate the carriage once during each revolution of said shaft and crank, an electric motor for rotating said shaft, a commutator on said shaft having a plurality of segments and co-operating brushes positioned to contact with said segments during predetermined positions of the cycle of movement of said commutator, a source of electric current for operating said motor and said electrically operated devices, a manually operable control switch for initially closing the circuit to said motor, means comprising a segment and associated brush of said commutator connected in parallel to said control switch for maintaining said motor circuit closed following initial movement of said commutator throughout the remainder of the revolution, other segments of said commutator being connected in the operating circuits of and serving to actuate in succession, during the first half revolution of said shaft, said shutter opening mechanism and said shutter closing mechanism, and serving to actuate said shutter setting mechanism during the second half of the revolution, said carriage reciprocating rearwardly during the first half of said revolution and reciprocating forwardly during the second half of said revolution to advance the previously exposed film.

14. A studio camera comprising a shutter, separate electrically operating devices for setting, opening, and closing said shutter respectively, a film moving mechanism comprising a carriage reciprocable longitudinally in the direction of movement of the film, said carriage having means for gripping a film in response to movement in one direction and for releasing the film in response to movement in the opposite direction, a shaft, a crank rotatable with said shaft, means linking said crank to said carriage to reciprocate the latter once during each rotation of said shaft, an electric motor for rotating said shaft, a commutator on said shaft having a plurality of segments and cooperating brushes positioned to contact with said segments during predetermined portions of the cycle of movement of said commutator, a source of electric current for operating said motor and said electrically operated devices, a manually operable control switch for initially closing the circuit to said motor, means comprising a segment and associated brush of said commutator connected in parallel to said control switch for maintaining said motor circuit closed following initial movement of said commutator through a predetermined portion of the cycle of revolution thereof, another segment of said commutator and its associated brush being connected in the operating circuit of and serving to actuate said shutter opening mechanism during said predetermined portion of the cycle, another segment of said commutator and its associated brush connected in parallel to said manually operable control switch for maintaining said motor circuit closed during the completion of the cycle of revolution, said second movement being initiated by said manually operable control switch, and a fourth segment on said commutator and an associated brush for actuating said shutter closing mechanism during the second phase of operation of said commutator, and a fifth segment on said commutator and an associated brush for actuating said shutter setting mechanism during the second half of the revolution of said commutator, said carriage reciprocating means being so oriented with respect to said commutator as to reciprocate said carriage rearwardly during the first half of said revolution and to reciprocate said carriage forwardly to advance the exposed film during the second half of the revolution.

15. A studio camera comprising a shutter, separate electrically operated devices for setting, opening, and closing said shutter respectively, a film supporting and moving mechanism, comprising a reciprocable member having means for gripping a film in response to movement in one direction and for releasing the film in response to movement in the opposite direction, a shaft, a crank rotatable with said shaft, means linking said crank to said carriage to reciprocate the latter once during each rotation of said shaft, a focusing screen, a mirror movable into and out of a position in front of said film holding means, a pair of electrically actuated means for moving said mirror into position between said film support and shutter, and out of position between said film and shutter respectively, an electric motor for driving said shaft, a source of current for energizing said motor and said electrically operated devices, a commutator on said shaft having eight segments thereon and brushes positioned to contact with said respective segments successively, all of said segments being out of contact with their respective brushes during the normal position of rest of said commutator, a manually operated switch for connecting said motor to said source, means comprising said first segment on said commutator and its associated brush for closing said motor circuit following initial movement of the commutator and maintaining it closed during the completion of the revolution, the second segment on the said commutator and its associated brush serving to momentarily connect said source to said shutter setting mechanism, the third segment on said commutator serving to momentarily subsequently connect said source to said mirror raising mechanism, the fourth segment on said commutator and its associated brush serving to connect said source to said shutter opening mechanism, said fifth segment of said commutator and its associated brush serving to subsequently momentarily connect said source to said shutter closing mechanism, all of said aforementioned segments closing with their respective brushes to perform the aforementioned operations during the first half revolution of said commutator and the movement of the crank associated with said shaft serving to simultaneously retract the film moving mechanism, the sixth segment on said commutator and its associated brush functioning during the second half revolution of said commutator to actuate said means for moving said mirror into position in front of said film mount, the seventh segment on said commutator and its associated brush functioning subsequently to again operate said shutter setting device, the eighth segment on said commutator closing with its associated brush thereafter to actuate said shutter opening device and the film moving mechanism being advanced during the last half revolution of said commutator and shaft to advance a new section of film into position to be exposed.

16. In a camera comprising a shutter, a film mount, a focusing screen, and a mirror movable between a position in front of said film mount and a position thereabove, separate electrically actuated devices for respectively setting said shutter, raising said mirror, opening said shutter, closing said shutter, and lowering said mirror, a source of electric current for actuating said devices, commutator means for momentarily connecting said source to said various electrically actuated devices in predetermined timed sequence, an electric motor for driving said commutator at a predetermined speed, a motor control segment on said commutator for continuously connecting said source to said motor except at the normal position of rest of the commutator, manually controlled switch means for initially connecting said source to said motor to move said commutator from its normal position of rest, said commutator comprising segments and associated brushes so positioned and connected between said source and said various separate electrically actuated devices as to sequentially set said shutter, raise said mirror, open said shutter, and close said shutter in the order given, during the first half revolution of said commutator, and to sequentially lower said mirror, set said shutter and open said shutter during the last half revolution of said commutator, means associated with said film mount for advancing a film therepast, and means rotatable with said commutator for actuating said last means during the last half revolution of said commutator.

17. A device as described in claim 16 in which said motor control segment is split into two separated sections whereby said commutator is initially rotated to sequentially set said shutter, raise said mirror, and open said shutter, and is then stopped and thereafter upon a second initial energization of said motor circuit by said manually controlled switch is maintained in rotation throughout the remainder of the cycle to sequentially close said shutter, lower said mirror, set said shutter, and open said shutter.

18. A device as described in claim 16 further characterized in that the segment on said commutator for closing said shutter is rotatably adjustable relative to the remaining segments to vary the time of exposure.

GEORGE M. WALTERS.